Patented July 6, 1937

2,085,786

UNITED STATES PATENT OFFICE 2,085,786

PROCESS OF SEPARATING LOWER ALKYLAMINES

Robert Roger Bottoms, Birmingham, Ala., assignor to The Girdler Corporation, Louisville, Ky., a corporation of Delaware No Drawing. Application October 22, 1936, Serial No. 107,024

7 Claims. (Cl. 260—127)

This invention relates to the separation of lower alkylamines, and it particularly relates to the separation of methylamines.

In processes of producing alkylamines, and particularly methylamines, by reacting the corresponding alkyl chlorides, halides, hydroxides and so forth, with ammonia or ammonium salts such as ammonium chloride, the reaction product usually contains substantial quantities of all three of the primary, secondary and tertiary amines, even though the temperature, pressure, proportions and other reaction conditions may be controlled so as to give rise to a preponderance of one of said amines.

These amines being of similar behavior and having only slightly different chemical and physical properties are difficult to separate, whether present as free bases or in the form of their hydrohalide salts.

I am aware that various special methods have been proposed for separating these amines, such as fractional distillation of azeotropic mixtures under superatmospheric pressure, with or without the addition of large quantities of ammonia, and fractional crystallization of the hydrohalide salts from a solvent such as alcohol. None of these methods is as simple or direct, nor does it produce as sharp a separation, as that which I am about to describe.

I have found that the lower alkylamines may be separated one from the other by taking advantage of their differences in basicity. In my preferred process, the amines, preferably the alkylamines or methylamines, desirably in the form of their hydrohalide, or hydrochloride salts, are treated with an alkaline material in sufficient quantity and of sufficient strength to displace one or more of the amines from its salt.

The dissociation constants of the amines are a measure of their basicity. For the purpose of my invention, these dissociation constants are given as follows:

|  | Methyl | Ethyl | Propyl |
|---|---|---|---|
| Mono | 0.00050 | 0.00056 | 0.00047 |
| Di | 0.00074 | 0.00126 | 0.00102 |
| Tri | 0.000074 | 0.00064 | 0.00055 |
| Ammonium hydroxide—0.000018 | | | |

It is evident from the above that each of the amines of a group has a different dissociation constant and therefore a different basicity. I have found that this fact enables me to accomplish a separation of certain of the amines from the others. Even though each of the primary, secondary and tertiary amines in one group has a different basicity, it is not economically feasible with my process to separate those which have approximately the same basicity. For example, in the case of the methylamines, it is entirely practical to treat a mixture of the three amine salts with a quantity of alkali stoichiometrically equivalent to the trimethylamine present in the mixture and subsequently to boil out or otherwise remove the liberated trimethylamine. It is not, however, economically possible to obtain a sharp separation by treating the resulting residue of mono and dimethylamine salts with a further quantity of alkali equivalent to the monomethylamine and boil the solution to obtain monomethylamine. The difference in basicity between the mono and dimethylamines is so small that good separation is not obtained.

In the case of the ethyl and propyl amines it is not economically possible to treat mixtures of the salts with a quantity of alkali equivalent to the primary amine present and then boil out this amine in pure condition. It is, however, entirely practical to treat such a mixture with a quantity of alkali equivalent to both the primary and tertiary amines present and then boil the solution so as to drive out these amines and leave only the secondary amine salt in the solution.

For the purpose of my invention it is practical to treat mixtures of the salts of the amines with a quantity of alkali which is equivalent stoichiometrically to the alkylamines present in the mixture which have dissociation constants smaller than 60% of the dissociation constant of the secondary amine present in the mixture.

It is also obvious from the above discussion that the amines in their free state may be treated with an acid in sufficient quantity to combine with the stronger amines and thus effect separation from the weaker amines. This fact forms the basis for my copending application Serial No. 107,025.

The preferred alkaline compounds for carrying out my invention are the alkali metal and alkaline earth metal oxides, hydroxides and carbonates, and these compounds are utilized in just sufficient amount to displace the desired amine or amines. It is obvious, of course, that if the mixture of amine salts also contains free mineral acid or an ammonium salt, an additional amount of alkali stoichiometrically equivalent to these substances must be added. I have also found that as alkaline reagents for accomplishing this separation it is possible to use other alkylamines or methylamines of different basicity. These amines may be used for displacement together with or in place of the alkalies above mentioned. For example, dimethylamine being more basic than trimethylamine may be utilized to displace trimethylamine from its hydrohalide salts, when utilized in stoichiometrical proportions. Similarly, diethylamine may be utilized to displace mono and triethylamine from their hydrohalide combinations.

For the complete separation of the methylamines, it is possible to apply my process for the liberation and recovery of trimethylamine from a mixture of the three amine hydrochlorides. After the trimethylamine has been driven off by heating, the residual solution may be evaporated to dryness and extracted with chloroform, whereupon the monomethylamine hydrochloride will remain insoluble while the dimethylamine hydrochloride will go into solution.

In the case of the ethyl and propyl amines, the secondary amines can be separated from the others by my process and the primary and tertiary amines may then be separated from each other by fractional distillation.

As examples of the method of applying my invention, I give the following examples which are merely illustrative:

Example 1.—A mixture of 120 grams of monomethylamine hydrochloride, 700 grams of dimethylamine hydrochloride, 140 grams of trimethylamine hydrochloride and 40 grams of ammonium chloride, all by weight, is dissolved in water, and the solution treated with 89 grams of caustic soda. After thorough agitation, the solution is heated to approximately its boiling point, whereby all of the trimethylamine and ammonia which were liberated by the caustic soda are distilled out of the solution. For separating the residual mono and dimethylamine hydrochlorides, the solution is evaporated to dryness and the residue extracted with chloroform, whereupon the monomethylamine hydrochloride and sodium chloride will remain insoluble while the dimethylamine hydrochloride will go into solution.

Example 2.—A mixture containing 400 grams of monoethylamine, 400 grams of diethylamine and 200 grams of triethylamine is dissolved in water containing 650 grams of HCl. This solution is then treated with 693 grams of caustic potash, which is just sufficient to neutralize the excess HCl and to liberate the mono and triethylamines. These are distilled from the solution, an additional 310 grams of caustic potash added, and the diethylamine distilled and recovered.

Example 3.—A dry mixture containing 200 grams of monomethylamine hydrochloride, 650 grams of dimethylamine hydrochloride and 150 grams of trimethylamine hydrochloride is extracted with chloroform. The chloroform solution containing the di and trimethylamine hydrochlorides is separated from the insoluble monomethylamine hydrochloride, evaporated to dryness, dissolved in water and treated with 83 grams sodium carbonate. The liberated trimethylamine is distilled from the solution, and the dimethylamine hydrochloride remaining in solution is recovered by evaporating the solution to dryness and extracting the hydrochloride with ethyl alcohol.

It is obvious that the various amines may be separated by many variations of the above procedures from varying mixtures, depending upon the proportions of each amine in the mixture. My process is equally applicable to mixtures containing only two rather than all three of the amines of a series. For example, it may be applied to a mixture of di and trimethylamine hydrochlorides, in the presence or absence of ammonium chloride.

Under certain conditions it is desirable to employ chloroform or other selective solvent to obtain a partial separation of the hydrochlorides as an initial step, and in other cases it is desirable to make the separation the final step. It is entirely feasible in some instances to use the amines themselves as the alkaline liberating reagents.

This application is a continuation in part of my prior and copending application Serial No. 18,883, filed April 29, 1935 and which has been abandoned.

Having thus described my invention, what I claim as new and desire to secure by Letters Patent is:

1. In the process of separating primary, secondary and tertiary lower alkylamines, the steps of treating a mixture containing the hydrohalide salts thereof with a quantity of alkali stoichiometrically equivalent to the alkylamines present in the mixture which have dissociation constants smaller than 60% of the dissociation constant of the secondary amine present in the mixture, and treating the resulting mixture to separate the liberated bases.

2. In the process of separating ammonia and primary, secondary and tertiary lower alkylamines, the steps of treating a mixture containing ammonium hydrohalide and the hydrohalide salts of said amines with a quantity of alkali stoichiometrically equivalent to the ammonia present in the mixture and to the alkylamines present in the mixture which have dissociation constants smaller than 60% of the dissociation constant of the secondary amine present in the mixture, and treating the resulting mixture to separate the liberated bases.

3. In the process of separating methylamines, the steps of treating a mixture containing the hydrochlorides thereof with a quantity of alkali stoichiometrically equivalent to the trimethylamine present in the mixture, and thereafter heating the resulting mixture to separate the liberated base.

4. The method of separating dimethylamine and trimethylamine, which comprises providing a solution of non-volatile inorganic acid addition salts of the said amines, adding thereto an alkali stoichiometrically equivalent to the trimethylamine present, and heating the mixture to remove the liberated trimethylamine.

5. The method of separating mono and triethylamines from diethylamine, which comprises providing a mixture containing the non-volatile inorganic acid addition salts of the said amines, adding thereto an alkali stoichiometrically equivalent to the said mono and triethylamines, and heating to remove the liberated mono and triethylamines.

6. The method of separating mono and tripropylamines from dipropylamine, which comprises providing a mixture containing the non-volatile inorganic acid addition salts of the said amines, adding thereto an alkali stoichiometrically equivalent to the said mono and tripropylamines, and heating to remove the liberated mono and tripropylamines.

7. The method of separating dimethylamine and trimethylamine, which comprises providing a mixture of non-volatile inorganic acid addition salts of the said amines, adding thereto a quantity of dimethylamine stoichiometrically equivalent to the trimethylamine present, and heating the mixture to remove the liberated trimethylamine.

ROBERT ROGER BOTTOMS.